C. R. FAIREY.
CONTROLLING DEVICE FOR AEROPLANES.
APPLICATION FILED APR. 23, 1919.
1,313,681.
Patented Aug. 19, 1919.
2 SHEETS—SHEET 1.
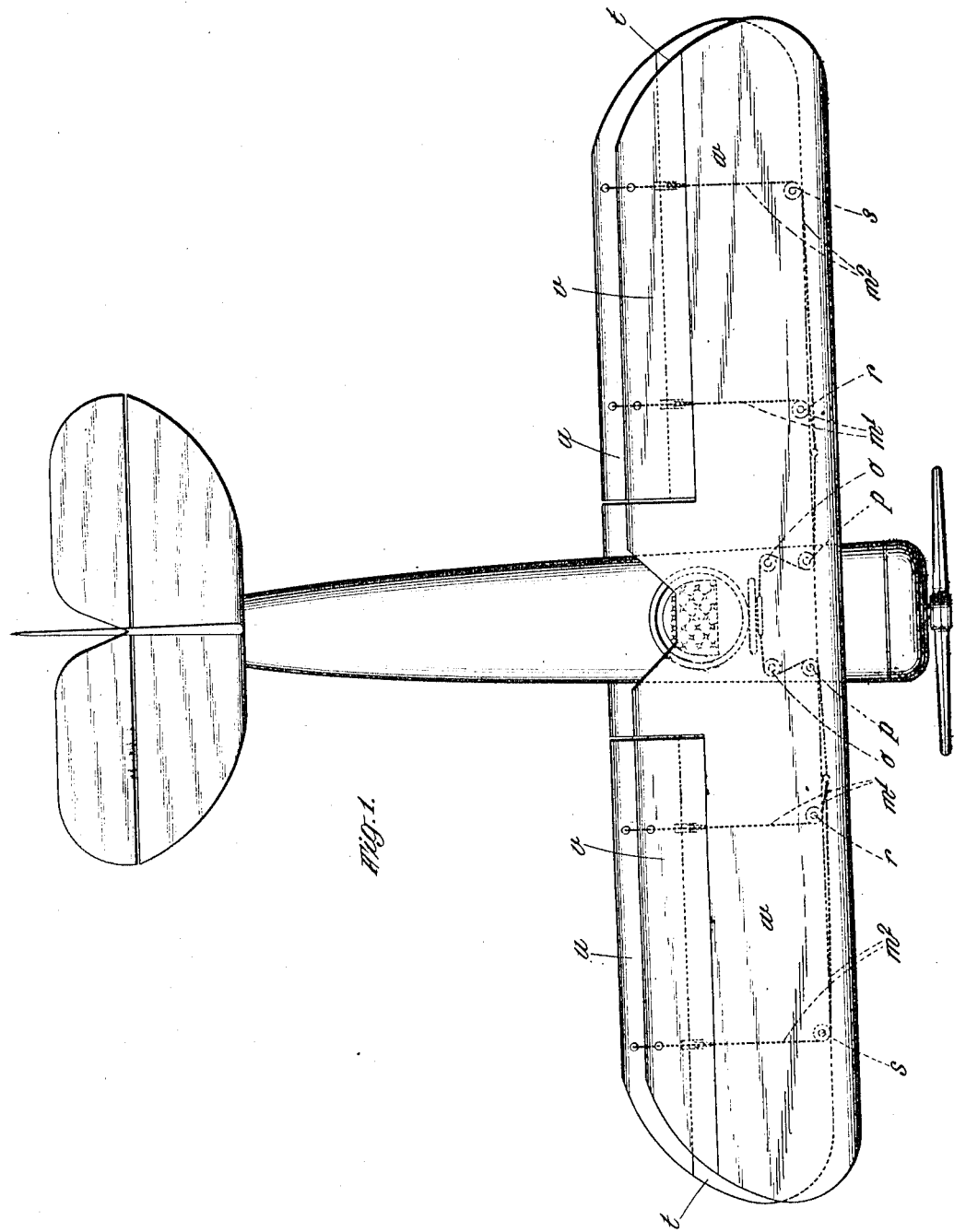

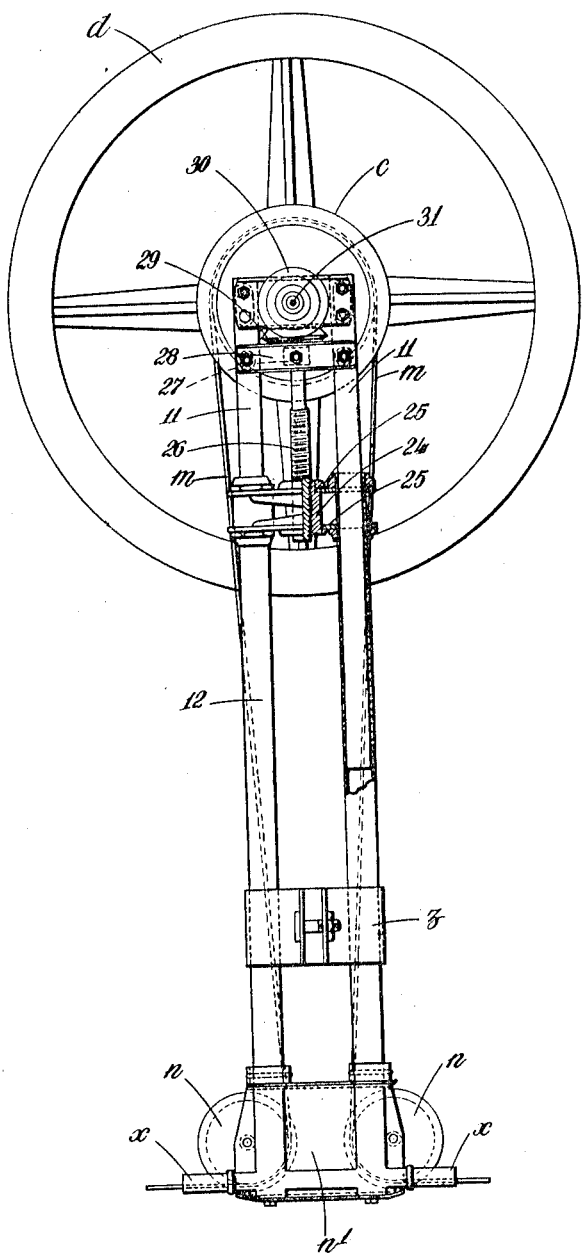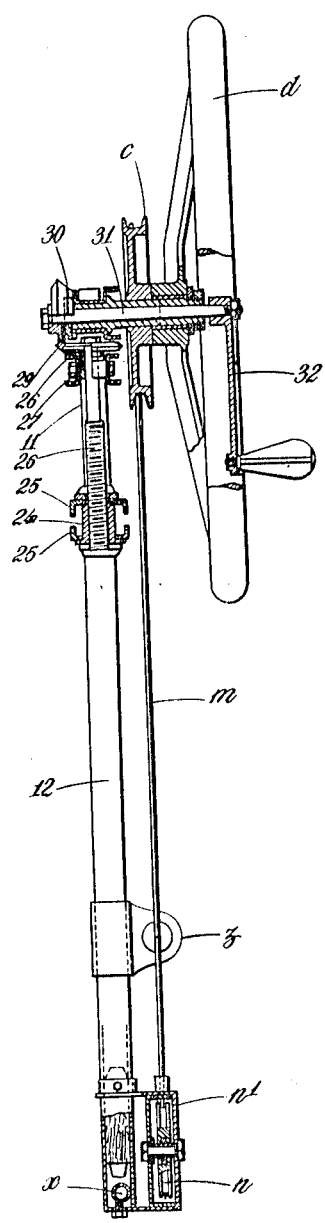

UNITED STATES PATENT OFFICE.

CHARLES RICHARD FAIREY, OF HAYES, ENGLAND.

CONTROLLING DEVICE FOR AEROPLANES.

1,313,681.  Specification of Letters Patent.  Patented Aug. 19, 1919.

Application filed April 23, 1919. Serial No. 292,166.

*To all whom it may concern:*

Be it known that I, CHARLES RICHARD FAIREY, a subject of the King of Great Britain, and formerly resident of Clayton Road, Hayes, in the county of Middlesex, England, but now of Cranford Lane, Hayes, in the county of Middlesex, England, have invented a certain new and useful Improvement in and Relating to Controlling Devices for Aeroplanes, of which the following is a specification.

This invention relates to the means for varying the camber of the wings of an aeroplane when they are so arranged, as regards fore and aft section, that part thereof can be hinged or the whole or part thereof can be flexed, and the object of the invention is to provide improved means whereby the camber of both wings may be varied simultaneously in the same direction in such manner as to change the fore and aft sections of said wings, so that the lifting power and efficiency of the machine as a whole can be varied with consequent modification of its speed capacity, yet without interfering with the capability of varying the camber of the respective wings simultaneously in reverse directions, at will, to control lateral stabilization as usual.

The alteration of camber may be effected, for instance, by varying the inclination, relatively to the main portion of a plane, of trailing marginal portions each extending throughout the whole length of a wing, each of such marginal portions forming preferably about one-fourth to one-third of the total chord of the plane, so that any change in the inclination of such marginal portions will produce an effect equivalent to an alteration in both the camber and the angle of incidence either of the plane as a whole, or of the respective wings.

The whole of the trailing marginal portion of each plane of the wings may be hinged after the manner of an aileron or such marginal portion or the whole of each wing may be made flexible with the result, in the latter cases, that the different wing sections obtained are more uniform. The angle through which a wing is varied need not be uniform throughout the whole length of the wing.

It has already been proposed to mount the manually-rotatable drum, upon which is wound the cable (or cables) for varying the cambers of both wings simultaneously but in reverse directions respectively, upon a control-pillar whereof the effective length is variable at will; rotation of the drum causing the camber of one wing to be increased and the camber of the opposite wing to be reduced, whereas alteration in the effective length of the control-pillar will cause the cambers of both wings to be simultaneously altered in the one direction or the other according as the pillar is lengthened or shortened. For this purpose the control-pillar has been made tubular and telescopic, its upper or movable section, which carries the drum and a hand-wheel for rotating the same, being adjusted lengthwise of the lower or stationary section in some cases by means of a hand-lever angularly movable over a quadrant whereby to lock the two sections together when the control-pillar, as a whole, has been brought to the desired effective length, and in some cases by means of rack-and-pinion mechanism.

According to the present invention the variation in the effective length of the telescopic control-pillar is brought about by means of screw mechanism.

In the accompanying drawings, wherein Figure 1 is a plan view of an aeroplane provided with controlling means according to the invention. Fig. 2 is a partly sectional front elevation and Fig. 3 is a partly sectional side elevation of one form of a control pillar constructed in accordance with the invention.

In the form of the invention shown in Figs. 2 and 3, the control-pillar whereon the drum $c$ with its controlling hand-wheel $d$ is supported, is constituted by two pairs of telescopic tubes 11, 11 and 12, 12, arranged side by side and provided with suitable crossheads.

The respective cables or portions of cable $m$, $m$ which are wound around the drum $c$ from opposite directions, extend downwardly from opposite sides of the drum and are led under a pair of guide-pulleys $n$, $n$ rotatably mounted in a frame $n^1$ constituting a crosshead at the bottoms of the portions 12, 12 of the tubes, and thence around stationary guide-pulleys, $o$, $p$, beyond which each cable $m$ is divided into two branches $m^1$ and $m^2$ which are respectively led around stationary guide-pulleys $r$ and $s$ (see Fig. 1) to the trailing marginal portions $u$, $v$ of the respective planes $t$ and $w$, as and for the purpose hereinbefore set forth. The marginal portions $u$, $u$ of the lower plane $t$ are connected with the trailing marginal portions $v$, $v$ of the upper plane $w$, and the marginal portions $u$, $v$ of each wing are adapted to be moved as one in opposition to the tension of springs or wind pressure in flight, as is usual.

By revolving the drum $c$ the cambers of the respective wings are simultaneously varied in reverse directions to control lateral stabilization in the usual manner. When, however, the screw 26 is revolved the portions 11, 11 of the tubes are caused to telescope relatively to the portions 12, 12, and the distance between the center of the drum $c$ and the centers of the guide-pulleys $n$, $n$ is increased or decreased, so that both cables (or portions of cable) $m$, $m$ and the separate portions $m^1$, $m^2$ of each (see Fig. 1) will be equally drawn upon or equally relaxed, with the result that the cambers of both wings will be varied simultaneously in the same direction, and the desired wing section obtained.

The pillar 11, 12 is provided at its foot with a spindle $x$ on which it may be rocked in the fore and aft direction for the actuation of the means for controlling elevation in the usual manner, and for this purpose a lug or bracket $z$ is provided for connection with said means.

In the form of the invention shown in Figs. 2 and 3, the telescoping of the control-pillar is effected by a nut 24 fixed on a crosshead 25 at the tops of the lower or fixed portions 12, 12 of the tubes, and adapted to coact with a screwed rod 26 rotatable in a bearing 27 carried by a crosshead 28 at the tops of the upper or slidable portions 11, 11 of the tubes, the rod 26 having fast upon its upper end a bevel wheel 29 in mesh with another bevel wheel 30 at the front end of a spindle 31 passing coaxially through the drum $c$ and its hand-wheel $d$, and having at its rear end a crank handle 32 or smaller hand-wheel whereby the rod 26 may be rotated to cause the portions 11, 11 of the tubes to be telescoped relatively to the portions 12, 12.

In all cases the hinges for the trailing marginal portions $u$ $u$ and $v$ $v$ of the wings are such that greater angular movement of said portions relatively to the rest of the wings will be permitted than can be produced by variation in the effective length of the control-pillar, with the result that to whatever extent said portions of both wings may have been moved simultaneously in the same direction, they will still be capable of movement simultaneously in reverse directions under the control of the hand-wheel $d$ and drum $c$. It will be understood that the drum may be replaced by a sprocket wheel adapted to coact with a length of chain to the ends of which the respective control cables are attached.

It will be obvious that the crosshead carrying the drum may be slidably mounted upon a control pillar of fixed length in order that the effective length of said pillar may be varied in accordance with this invention.

I claim:—

In an aeroplane having wings each of which has a trailing marginal portion whereof the inclination is variable relatively to the main portion of the wing, the combination of a telescopic control-pillar comprising a plurality of sections one of which is fixed and another of which is movable for varying the effective length of the pillar, a manually-rotatable drum carried by said movable section, a cable wound on and extending from opposite sides of said drum and attached by its opposite ends to the trailing marginal portions of the respective wings for varying the cambers of both wings simultaneously but in reverse directions respectively, a fixed nut carried by the fixed section of the pillar, a bearing on the movable section of the pillar, a screwed rod rotatable in said bearing but held against endwise movement therethrough and in threaded engagement with said nut, a bevel wheel fast on said screwed rod, a spindle passing coaxially through and rotatable relatively to said drum, a bevel wheel fast on said spindle and in mesh with the first-mentioned bevel wheel, and means for rotating said spindle for moving the movable section of the pillar to vary the cambers of both wings simultaneously in the same direction.

CHARLES RICHARD FAIREY. [L. S.]